Oct. 6, 1970  YOH TANAKA  3,532,419
PROJECTOR

Filed April 17, 1968  3 Sheets-Sheet 1

INVENTOR
YOH TANAKA

BY *Sughrue, Rothwell, Mion, Zinn & Macpeak*

ATTORNEYS.

Oct. 6, 1970 YOH TANAKA 3,532,419
PROJECTOR
Filed April 17, 1968 3 Sheets-Sheet 2

INVENTOR
YOH TANAKA

BY
ATTORNEYS.

Oct. 6, 1970  YOH TANAKA  3,532,419
PROJECTOR

Filed April 17, 1968  3 Sheets-Sheet 3

INVENTOR
YOH TANAKA

BY *Sughrue, Rothwell, Mion, Zinn & Macpeak*
ATTORNEYS

United States Patent Office 3,532,419
Patented Oct. 6, 1970

3,532,419
PROJECTOR
Yoh Tanaka, Tokyo, Japan, assignor to Fuji Photo Film Co., Ltd., Ashigara-Kamigun, Kanagawa, Japan
Filed Apr. 17, 1968, Ser. No. 722,022
Claims priority, application Japan, Apr. 18, 1967, 42/24,703
Int. Cl. G03b 21/28
U.S. Cl. 353—73    4 Claims

ABSTRACT OF THE DISCLOSURE

A hollow drum hingedly couples relatively thin housing and cover members while carrying internally optical projecting system components for transmitting an optical image from a film carried by one of the hinged members onto a screen carried by the other hinge member or externally projecting the same.

BACKGROUND OF THE INVENTION

The present invention relates to a novel and useful projector for projecting image from movie film or slide films.

Heretofore, a separate screen is required in the projection of film images, thereby making the operation troublesome.

The present invention provides a projector incorporating a screen therein, thereby avoiding the necessity of employing separate screen means to simplify the operation of the projector.

SUMMARY OF THE INVENTION

The present invention comprises a novel portable projector including a housing and a mating cover, swingably connected to the housing and thereby forming an operable trunk-shaped assembly. All the elements necessary for the projection of the film image are incorporated in the assembly thereby making an easily operable projector.

DETAILED DESCRIPTION OF THE PREFERRED EMBODIMENTS

Figure 1:
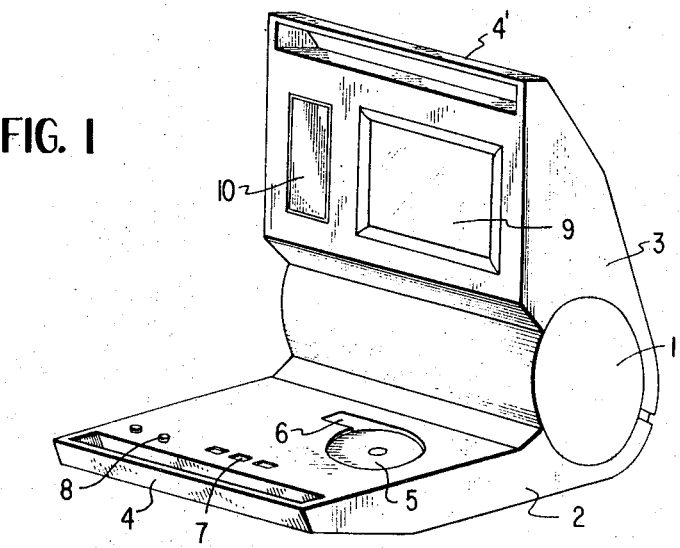
FIG. 1 is a perspective view of the projector constructed in accordance with the present invention in open position for operation.
Figure 2:
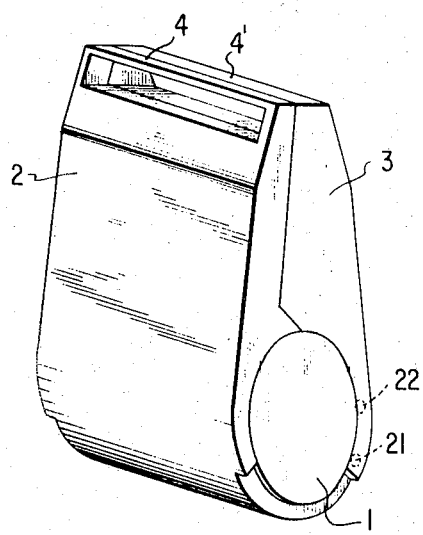
FIG. 2 is a perspective view of the projector of FIG. 1 in its non-operating state.

FIG. 1 shows the projector assembly of the present invention when in operating position. The projector comprises a housing or member 2 secured to a relatively large diameter drum 1 and a cover or member 3, swingably connected to drum 1 so as to swing about the axis of said drum 1. The outer ends of the housing 2 and the cover 3 are provided with hand grips 4 and 4', respectively. When cover 3 is closed as shown in FIG. 2, the projector can be conveniently transported. A film chamber 6, loaded with a reel or magazine 5 therein, and projection control means such as operating buttons 7 and knobs 8 are provided in housing 2. An optical system comprising a light source, objective lens and a film driving mechanism, etc., are also located within the housing 2. Window-shaped screen 9 and speaker 10, etc., are provided on the inside of cover 3. In order to project the image on the film loaded in the housing 2, optical system including mirrors is provided interior of the drum and the cover 3 as described hereinbelow.

Although it is not necessary to provide hand grips 4 and 4' in both housing 2 and cover 3, as shown, the provision of hand grips 4 and 4' positively prevents the cover 3 from being opened when the projector is transported, thereby insuring safe handling of the projector.

It is also possible to locate a part of the mechanism such as the film driving mechanism in the hollow space within drum 1.

Drum 1 may also be secured to cover 3 instead of being secured to housing 2. Speaker 10 is, of course, provided only when the projector is provided with sound reproducing means.

Any known means for latching cover 3 in its open position or closed position can be utilized in the projector of the present invention. In the embodiment shown, circular recessed portion 21 is provided adjacent to the periphery of drum 1 as shown in FIG. 2 and a pin 22 is provided in the inner surface of cover 3 at the position corresponding to the position of recessed portion 21 when cover 3 is swung, said pin 22 is urged outwardly from said cover 3 by means of spring (not shown), thereby holding cover 3 in its open position by virtue of the engagement of pin 22 with recessed portion 21.

Figure 3:
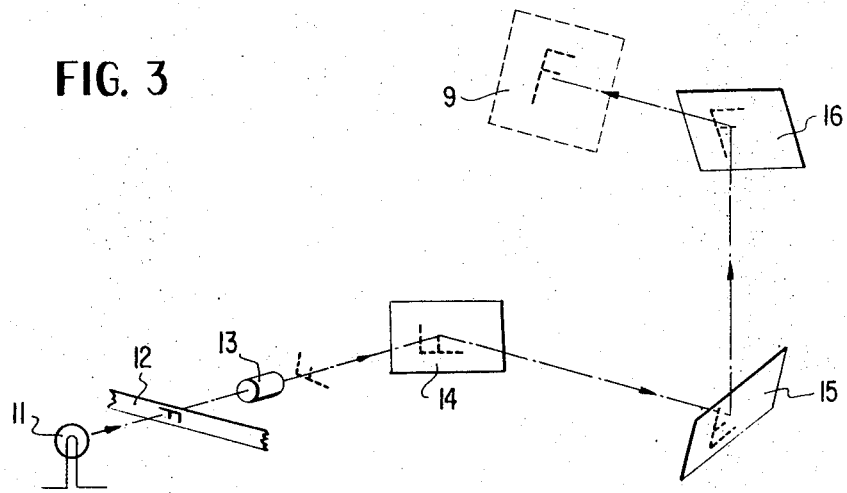
FIG. 3 is a schematic, perspective view of the optical system incorporated in the projector of FIG. 1.

The basic optical system of the present invention is shown in FIG. 3. The light, emanating from light source 11, passes through film 12 and objective lens 13, and is reflected three times by mirrors 14, 15 and 16, and reaches screen 9, so that the image on film 12 is projected onto screen 9. Mirrors 14, 15 and 16 are arranged as shown in FIG. 2 so that erect image is projected on screen 9. In practice, it is evident that mirrors 14, 15 and 16 should be made successively large in size in the above described order. Prisms may be used in place of mirrors 14, 15 and 16.

Figure 4:
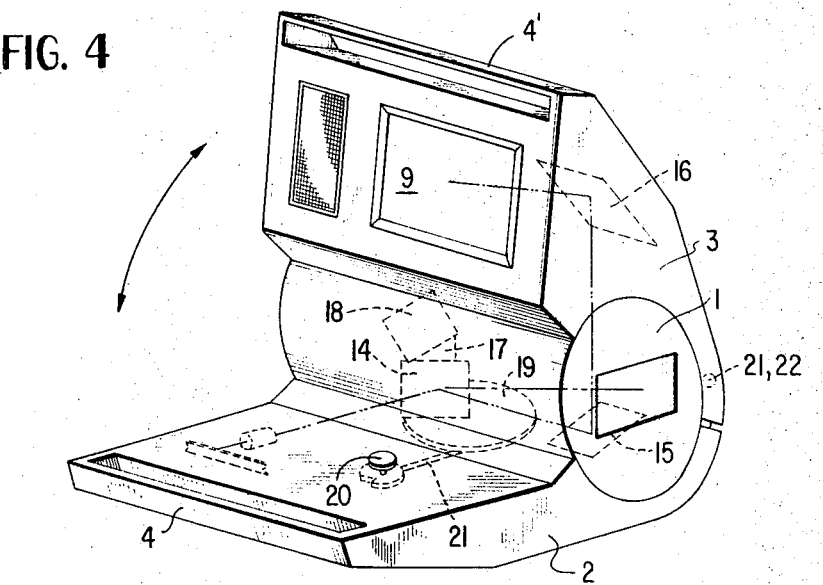
FIG. 4 is a schematic, perspective view of another embodiment of the projector of the present invention allowing a part of the optical system to be modified as illustrated by the phantom lines.
Figure 5B:
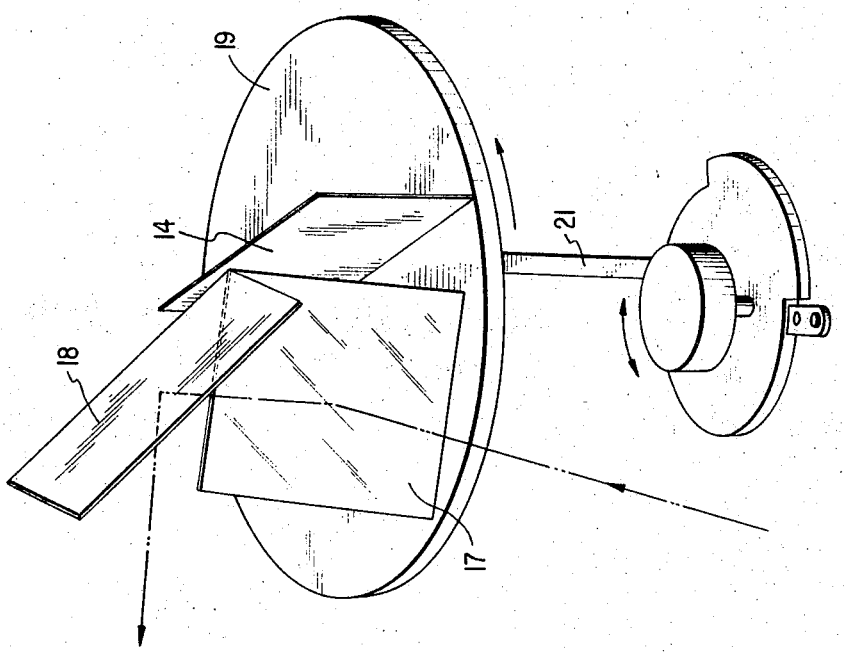
FIG. 5B is a schematic, perspective view of the modifiable portion of the optical system of FIG. 4 in a second position.
Figure 5A:
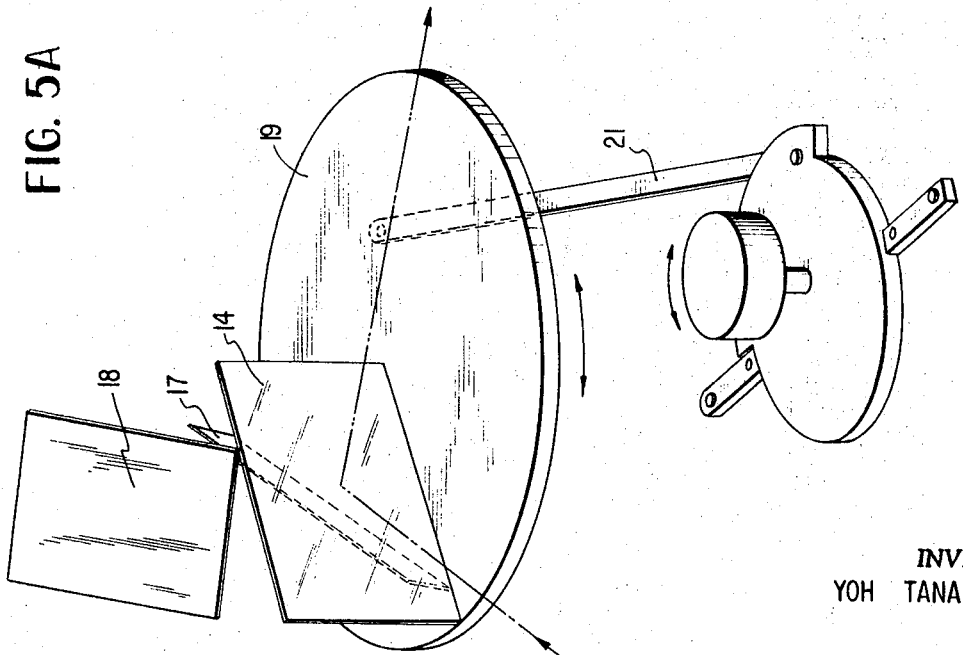
FIG. 5A is a schematic, perspective view of the modifiable portion of the optical system of FIG. 4 in a first position.

FIG. 4 shows another embodiment of the projector of the present invention, in which a mirror, such as the mirror 14 of FIG. 3 can be interchanged with other mirrors, thereby permitting the film image to be projected at higher magnification on a separate larger screen located at a distance from the projector. As shown in FIG. 5, the interchangeable mirror assembly as described above comprises mirror 14 and mirrors 17 and 18, which are all secured to rotatable base 19. Rotating of base 19 is achieved by means of knob 20 provided on housing 2. Connecting rod 21 is connected at its one end to base 19, and at its other end to knob 20. Mirrors 17 and 18 are selectively located in the optical path for greater magnification instead of mirror 14 which is located in the optical path for projection on screen 9. Mirror 17 reflects the light from light source 11 through objective lens 13 upwardly. Mirror 18 reflects the light reflected from mirror 17 toward the side of the projector. Thus, projection on screen 9 or projection on a separate larger screen, exterior of the projector, can be effected by switching the mirrors as described above. Prisms can also be used in place of mirrors 14, 17 and 18. Any known means for switching the mirrors can be embodied in the projector of the present invention. To this end, a hole for passing projected light may be provided in the side of drum 1. In operation of the projector described above, projection can be effected with the cover closed after the focusing of the objective lens has been achieved.

As described above, since the projector of the present invention is in the form of a suitcase, when the cover is closed, the projector can be transported very conveniently, and, at the same time, the projector can be promptly set up when the cover is opened. The operator can operate the control means while he is viewing the projected image on the screen within the inner wall of the cover, thereby making it easy to adjust the focusing. The present invention therefore provides a very compact and useful projector.

In the claims:

1. A compact, clam shell type projector assembly comprising: relatively thin housing and mating cover members, a hollow drum member hingedly coupling said housing and mating cover members, a light source and a film carried by one of said hinged members, a screen carried by said other hinged member, and optical reflection means carried by said hollow member for projecting light from said source to said screen.

2. The projector as claimed in claim 1 further comprising light transmitting means carried by one of said members allowing a film image to be projected therefrom and wherein said optical projecting means carried by said drum includes means for switching the optical path of the projected image from said screen carried by said one member to said light transmitting means.

3. The projector assembly as in claim 2 wherein said optical projecting means carried by said drum comprises: a rotatable plate, manually operable means for rotating said plate about an axis thereof, a plurality of mirrors disposed on said plate so as to reflect light onto said screen with said plate in a first position, and to reflect transmitted light exterior of said assembly through said light transmitting means when said plate is manually rotated to another position.

4. The projector assembly as in claim 1 wherein said film is carried by a magazine positioned within said housing member, said screen is carried on the inside wall of the cover member and projection controls are carried on the inside wall of the housing member.

References Cited

UNITED STATES PATENTS

| | | | |
|---|---|---|---|
| 3,310,360 | 3/1967 | Jarvis | 353—72 |
| 3,288,549 | 10/1966 | Bottani | 352—104 |
| 3,173,330 | 3/1965 | Parker | 353—72 |
| 3,023,668 | 3/1962 | Allen | 353—73 |
| 2,746,344 | 5/1956 | Pratt | 353—78 |
| 2,575,579 | 10/1951 | Bullock | 352—34 |

WILLIAM D. MARTIN, Jr., Primary Examiner

U.S. Cl. X.R.

353—78, 119